(12) United States Patent
Xu (10) Patent No.: US 12,177,860 B2
(45) Date of Patent: Dec. 24, 2024

(54) APPARATUS AND METHOD OF WIRELESS COMMUNICATION

(71) Applicant: GUANGDONG OPPO MOBILE TELECOMMUNICATIONS CORP., LTD., Guangdong (CN)

(72) Inventor: Jing Xu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 372 days.

(21) Appl. No.: 17/564,094

(22) Filed: Dec. 28, 2021

(65) Prior Publication Data

US 2022/0124791 A1 Apr. 21, 2022

Related U.S. Application Data

(63) Continuation of application No. PCT/CN2020/129355, filed on Nov. 17, 2020.

(Continued)

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 5/0053* (2013.01); *H04W 72/20* (2023.01); *H04W 72/566* (2023.01); *H04W 76/30* (2018.02)

(58) Field of Classification Search
CPC .......... H04W 72/23; H04W 72/20; H04W 72/566; H04W 76/30; H04W 52/146;
(Continued)

(56) References Cited

U.S. PATENT DOCUMENTS 11,184,892 B2* 11/2021 Salah ..................... H04L 1/189
2009/0052387 A1 2/2009 Lee et al.
(Continued)

FOREIGN PATENT DOCUMENTS

CN 108702776 A1 10/2018
CN 110035543 A1 7/2019
(Continued)

OTHER PUBLICATIONS

International Search Report (ISR) dated Jan. 29, 2021 for Application No. PCT/CN2020/129355.
(Continued)

*Primary Examiner* — Mang Hang Yeung
(74) *Attorney, Agent, or Firm* — Ladas & Parry, LLP (57) ABSTRACT

An apparatus and a method of wireless communication are provided. The method by a user equipment (UE) includes being configured with an information element (IE) from a base station and performing a configured grant (CG) transmission using a first parameter from the IE, wherein the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH. This can solve issues in the prior art, support HARQ-ACK codebooks in CG, support a PUSCH transmission scheme switching, support power control for CG, provide a good communication performance, and/or provide high reliability.

25 Claims, 3 Drawing Sheets

Related U.S. Application Data (60) Provisional application No. 62/936,603, filed on Nov. 17, 2019.

(51) Int. Cl.
*H04L 5/00* (2006.01)
*H04W 72/20* (2023.01)
*H04W 72/566* (2023.01)
*H04W 76/30* (2018.01)

(58) Field of Classification Search
CPC ............... H04W 52/281; H04W 72/21; H04L 1/1812; H04L 5/0053; H04L 1/08; H04L 1/1854; H04L 1/1864; H04L 1/189
USPC ........................................................ 370/329
See application file for complete search history.

(56) References Cited

U.S. PATENT DOCUMENTS

| | | | |
|---|---|---|---|
| 2019/0268935 A1 | 8/2019 | Talarico et al. | |
| 2021/0007087 A1* | 1/2021 | Wei ....................... | H04W 72/21 |
| 2021/0022132 A1* | 1/2021 | Park ................. | H04W 72/0473 |
| 2022/0053552 A1* | 2/2022 | Li ......................... | H04W 72/23 |

FOREIGN PATENT DOCUMENTS

| | | |
|---|---|---|
| CN | 110099449 A | 8/2019 |
| CN | 110167173 A1 | 8/2019 |
| JP | 2011139330 A | 7/2011 |
| JP | 2011151761 A | 8/2011 |
| WO | 2019144898 A1 | 8/2019 |
| WO | 2019193732 A1 | 10/2019 |
| WO | 2019216729 A1 | 11/2019 |
| WO | 2021093892 A1 | 5/2021 |

OTHER PUBLICATIONS

Written Opinion (WOSA) dated Jan. 29, 2021 for Application No. PCT/CN2020/129355.

The Notice of Allowance of corresponding Chinese application No. 202111063553.8, dated Apr. 13, 2022.

Nokia, Nokia Shanghai Bell. 3GPP TSG-RAN WG1 Meeting #96 R1-1903368; Summary of contributions on potential enhancements for PUSCH for NR URLLC (AI 7.2.6.1.3); Athens, Greece, Feb. 25-Mar. 1, 2019, entire document.

Huawei, HISilicon. 3GPP TSG RAN WG1 Meeting #95 R1-1812226; Enhanced UL configured grant transmissions Spokane, USA, Nov. 12-16, 2018, entire document.

The EESR of corresponding European application No. 20886224.3, dated Jun. 7, 2022.

Zte et al: "Consideration on NR V2X configured grant resource allocation", 3GPP Draft; R2-1906480, 3rd Generation Partnership Project (3GPP), Mobile Competence Centre; 650, Route Des Lucioles; F-06921 Sophia-Antipolis Cede, vol. RAN WG2, no. Reno, USA; May 13, 2019-May 17, 2019 May 13, 2019 (May 13, 2019), XP051729945, entire document.

Catt: "Corrections to DL/UL scheduling and HARQ management", 3GPP Draft; R1-1808380, 3rd Generation Partnership Project (3GPP), Mobile Competence Centre; 650, Route Des Lucioles; F-06921 Sophia-Antipolis Cedex; France, vol. RAN WG1, no. Gothenburg, Sweden; Aug. 20, 2018-Aug. 24, 2018 Aug. 11, 2018(Aug. 11, 2018), XP051515762, entire document.

Spreadtrum Communications: "Discussion on UL grant-free transmission enhancements," 3GPP Draft; R1-1813069, 3rd Generation Partnership Project (3GPP), Mobile Competence Centre; 650, Route Des Lucioles; F-06921 Sophia-Antipolis C, vol. RAN WG1, No. Spokane, USA; Nov. 12, 2018-Nov. 16, 2018 Nov. 11, 2018(Nov. 11, 2018), XP051555052, entire document.

* cited by examiner

APPARATUS AND METHOD OF WIRELESS COMMUNICATION

CROSS-REFERENCE TO RELATED APPLICATIONS

This application is a continuation of International Application No. PCT/CN2020/129355, filed on Nov. 17, 2020, which claims priority to U.S. Patent Application No. 62/936,603, filed on Nov. 17, 2019. Both of the above applications are hereby incorporated by reference in their entireties.

TECHNICAL FIELD

The present application relates to the field of communication systems, and more particularly, to an apparatus and a method of wireless communication, which can provide a good communication performance and/or high reliability.

BACKGROUND

Wireless communication systems are widely deployed to provide various types of communication content such as voice, video, packet data, messaging, broadcast, and so on. These wireless communication systems may be capable of supporting communication with multiple users by sharing available system resources (e.g., time, frequency, and power). Examples of such multiple-access systems include fourth generation (4G) systems such as long term evolution (LTE) systems and fifth generation (5G) systems which may be referred to as new radio (NR) systems. A wireless multiple-access communications system may include a number of base stations or network access nodes, each simultaneously supporting communication for multiple communication devices, which may be otherwise known as user equipments (UEs). A wireless communication network may include a base station that can support communication for a UE. The UE may communicate with the base station via downlink and uplink. The downlink refers to a communication link from the base station to the UE, and the uplink refers to a communication link from the UE to the base station.

In wireless communications, physical uplink shared channel (PUSCH) transmissions can be: dynamically scheduled by an uplink grant in a downlink control information (DCI), this is referred to as a dynamic grant; semi-statically configured and scheduled by higher layer parameters without detection of an uplink grant in a DCI, this is referred to as a type 1 configured grant (CG); or semi-statically configured by higher layer parameters and semi-persistently scheduled by an uplink grant in a DCI, this is referred to as a type 2 CG. How to use hybrid automatic repeat request acknowledgement (HARQ-ACK) codebooks, power control for inter-UE multiplexing, and/or PUSCH repetition enhancement in configured grant transmission is still an open issue.

Therefore, there is a need for an apparatus (such as a user equipment (UE) and/or a base station) and a method of wireless communication, which can solve issues in the prior art, support HARQ-ACK codebooks in CG, support a PUSCH transmission scheme switching, support power control for CG, provide a good communication performance, and/or provide high reliability.

SUMMARY

An object of the present disclosure is to propose an apparatus (such as a user equipment (UE) and/or a base station) and a method of wireless communication, which can solve issues in the prior art, support HARQ-ACK codebooks in CG, support a PUSCH transmission scheme switching, support power control for CG, provide a good communication performance, and/or provide high reliability.

In a first aspect of the present disclosure, a method of wireless communication by a user equipment (UE), comprising being configured with an information element (IE) from a base station and performing a configured grant (CG) transmission using a first parameter from the IE, wherein the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH.

In a second aspect of the present disclosure, a method of wireless communication by a base station comprising configuring an information element (IE) to a user equipment (UE) and controlling the UE to perform a configured grant (CG) transmission using a first parameter from the IE, wherein the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH.

In a third aspect of the present disclosure, a user equipment comprises a memory, a transceiver, and a processor coupled to the memory and the transceiver. The processor is configured with an information element (IE) from a base station. The processor is configured to perform a configured grant (CG) transmission using a first parameter from the IE, and the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH.

In a fourth aspect of the present disclosure, a base station comprises a memory, a transceiver, and a processor coupled to the memory and the transceiver. The processor is configured to configure an information element (IE) to a user equipment (UE). The processor is configured to control the UE to perform a configured grant (CG) transmission using a first parameter from the IE, wherein the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments, two hybrid automatic repeat request acknowledgement (HARQ-ACK) codebooks, power control for inter-user equipment (UE) multiplexing, and a physical uplink shared channel (PUSCH) repetition enhancement have been discussed for dynamic transmission. Configured grant (CG) transmission includes a type 1 CG transmission and a type2 CG transmission. For type 1 CG transmission, all parameters are configured by a radio resource control (RRC). For type 2 CG transmission, partial parameters are configured by an RRC, partial parameters are indicated by a downlink control information (DCI), which is used for a type 2 CG activation. The RRC related parameters are configured by ConfiguredGrantConfig information element, as illustrated in a table 1.

TABLE 1

ConfiguredGrantConfig information element

```
-- ASN1START
-- TAG-CONFIGUREDGRANTCONFIG-START
ConfiguredGrantConfig ::=          SEQUENCE {
    frequencyHopping                   ENUMERATED {intraSlot, interSlot}
        OPTIONAL,    -- Need S,
    cg-DMRS-Configuration              DMRS-UplinkConfig,
    mcs-Table                          ENUMERATED {qam256, qam64LowSE}
OPTIONAL,    -- Need S
    mcs-TableTransformPrecoder         ENUMERATED {qam256, qam64LowSE}
OPTIONAL,    -- Need S
    uci-OnPUSCH                          SetupRelease { CG-UCI-OnPUSCH }
OPTIONAL,    -- Need M
    resourceAllocation                 ENUMERATED { resourceAllocationType0,
resourceAllocationType1, dynamic Switch },
    rbg-Size                           ENUMERATED {config2}
OPTIONAL,    -- Need S
    powerControlLoopToUse               ENUMERATED {n0, n1},
    p0-PUSCH-Alpha                      P0-PUSCH-AlphaSetId,
    transformPrecoder                  ENUMERATED {enabled, disabled}
OPTIONAL,    -- Need S
    nrofHARQ-Processes                  INTEGER(1..16),
    repK                                ENUMERATED {n1, n2, n4, n8},
    repK-RV                             ENUMERATED {s1-0231, s2-0303, s3-0000}
OPTIONAL,    -- Need R
    periodicity                         ENUMERATED {
                                            sym2, sym7, sym1x14, sym2x14,
sym4x14, sym5x14, sym8x14, sym10x14, sym16x14, sym20x14,
                                            sym32x14, sym40x14, sym64x14,
sym80x14, sym128x14, sym160x14, sym256x14, sym320x14, sym512x14,
                                            sym640x14, sym1024x14,
sym1280x14, sym2560x14, sym5120x14,
                                            sym6, sym1x12, sym2x12, sym4x12,
sym5x12, sym8x12, sym10x12, sym16x12, sym20x12, sym32x12,
                                            sym40x12, sym64x12, sym80x12,
sym128x12, sym160x12, sym256x12, sym320x12, sym512x12, sym640x12,
                                            sym1280x12, sym2560x12
    },
    configuredGrantTimer                INTEGER (1..64)
OPTIONAL,    -- Need R
```

TABLE 1-continued

ConfiguredGrantConfig information element

```
        rrc-ConfiguredUplinkGrant                SEQUENCE {
            timeDomainOffset                         INTEGER (0..5119),
            timeDomainAllocation                     INTEGER (0..15),
            frequencyDomainAllocation                BIT STRING (SIZE(18)),
            antennaPort                              INTEGER (0..31),
            dmrs-SeqInitialization                   INTEGER (0..1)
OPTIONAL,    -- Need R
            precodingAndNumberOfLayers               INTEGER (0..63),
            srs-ResourceIndicator                    INTEGER (0..15)
OPTIONAL,    -- Need R
            mcsAndTBS                                INTEGER (0..31),
            frequencyHoppingOffset                   INTEGER (1..
maxNrofPhysicalResourceBlocks-1)                     OPTIONAL,   -- Need R
            pathlossReferenceIndex                   INTEGER
(0..maxNrofPUSCH-PathlossReferenceRSs-1),
            ...
        }
OPTIONAL,        -- Need R
        ...
    }
    CG-UCI-OnPUSCH ::= CHOICE {
        dynamic                                   SEQUENCE (SIZE (1..4)) OF BetaOffsets,
        semiStatic                                BetaOffsets
    }
    -- TAG-CONFIGUREDGRANTCONFIG-STOP
-- ASN1STOP
```

In some embodiments, PUSCH repetition scheme includes two options: a release 16 (Rel-16) PUSCH transmission scheme and a release 15 (Rel-15) PUSCH transmission scheme. For Rel-16 PUSCH transmission scheme: Option 4. For Rel-15 PUSCH transmission scheme: the transmission is done according to Rel-15 behavior, either with or without slot aggregation. With slot aggregation, the number of repetitions can be either semi-statically configured (as in Rel-15) or dynamically indicated (as agreed for Rel-16).

Here is the description of Option 4 from TR 38.824: One or more actual PUSCH repetitions in one slot, or two or more actual PUSCH repetitions across slot boundary in consecutive available slots, is supported using one uplink (UL) grant for dynamic PUSCH, and one configured grant configuration for configured grant PUSCH. It further consists of:

1. The number of the repetitions signaled by gNB represents the "nominal" number of repetitions. The actual number of repetitions can be larger than the nominal number. FFS dynamically or semi-statically signalled for dynamic PUSCH and type 2 configured grant PUSCH.

2. The time domain resource assignment (TDRA) field in the DCI or the TDRA parameter in the type 1 configured grant indicates the resource for the first "nominal" repetition.

3. The time domain resources for the remaining repetitions are derived based at least on the resources for the first repetition and the UL/downlink (DL) direction of the symbols. For further study (FFS) the detailed interaction with the procedure of UL/DL direction determination.

4. If a "nominal" repetition goes across the slot boundary or DL/UL switching point, this "nominal" repetition is splitted into multiple PUSCH repetitions, with one PUSCH repetition in each UL period in a slot. Handling of the repetitions under some conditions, e.g., when the duration is too small due to splitting, is to be further investigated in the work item (WI) phase.

5. No demodulation reference signa (DMRS) sharing across multiple PUSCH repetitions.

6. The maximum transport block size (TBS) is not increased compared to Rel-15.

7. FFS: L>14.

8. S+L can be larger than 14.

9. FFS: The bitwidth for TDRA is up to 4 bits.

10. Note: different repetitions may have the same or different redundancy versions (RVs).

Figure 1:
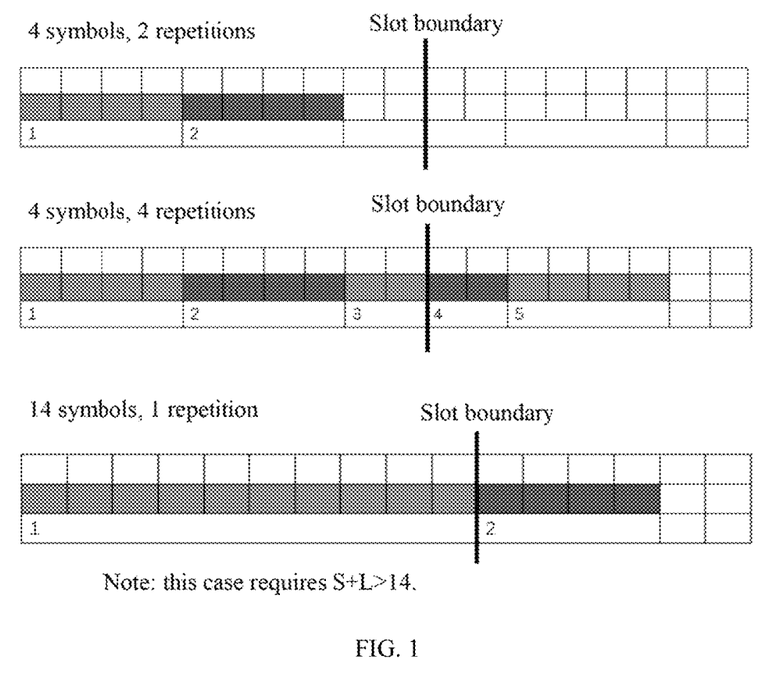
FIG. 1 is a schematic diagram illustrating examples of option 4 for physical uplink shared channel (PUSCH) enhancements.

FIG. 1 illustrates examples of option 4 for physical uplink shared channel (PUSCH) enhancements. These examples include an example of 4 symbols and 2 repetitions, an example of 4 symbols and 4 repetitions, and an example of 14 symbols and 1 repetition. In the example of 14 symbols and 1 repetition, S plus L is greater than 14. S may refer to a number of symbols, L may refer to a number of overall resources for one repetition, and a value of S may equal to a value of L.

Figure 2:
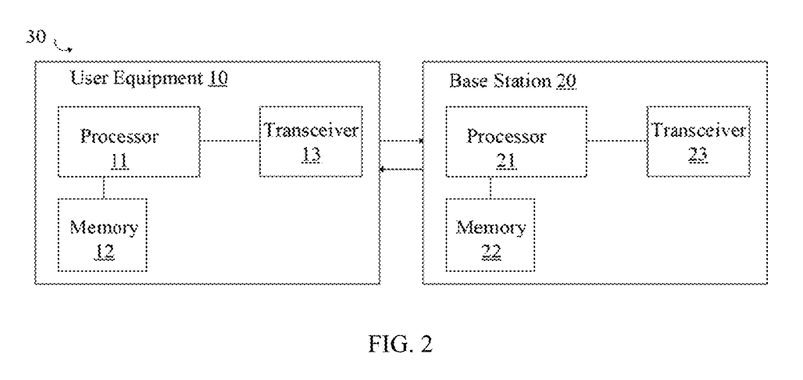
FIG. 2 is a block diagram of one or more user equipments (UEs) and a base station of wireless communication in a communication network system according to an embodiment of the present disclosure.

FIG. 2 illustrates that, in some embodiments, one or more user equipments (UEs) 10 and a base station (e.g., gNB or eNB) 20 for wireless communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12, the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured with an information element (IE) from the base station 20. The processor 11 is configured to perform a configured grant (CG) transmission using a first parameter from the IE, and the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH. This can solve issues in the prior art, support HARQ-ACK codebooks in CG, support a PUSCH transmission scheme switching, support power control for CG, provide a good communication performance, and/or provide high reliability.

In some embodiments, the processor 21 is configured to configure an information element (IE) to the UE 10. The processor 21 is configured to control the UE 10 to perform a configured grant (CG) transmission using a first parameter from the IE, wherein the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH. This can solve issues in the prior art, support HARQ-ACK codebooks in CG, support a PUSCH transmission scheme switching, support power control for CG, provide a good communication performance, and/or provide high reliability.

Figure 3:
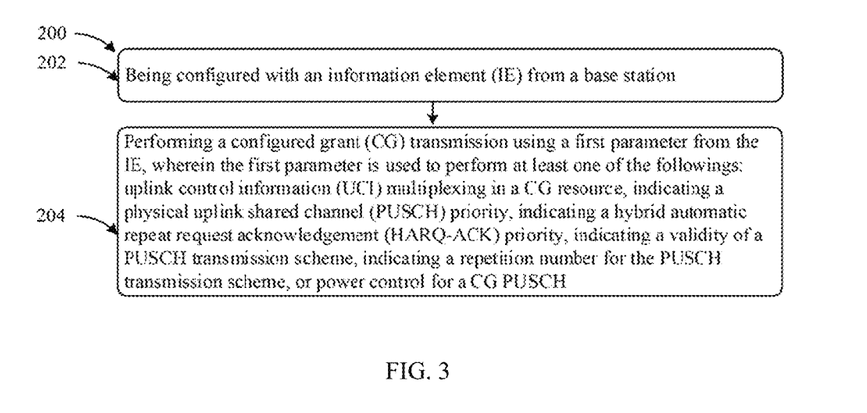
FIG. 3 is a flowchart illustrating a method of wireless communication performed by a user equipment (UE) according to an embodiment of the present disclosure.

FIG. 3 illustrates a method 200 of wireless communication by a user equipment (UE) according to an embodiment of the present disclosure. In some embodiments, the method 200 includes: a block 202, being configured with an information element (IE) from a base station, and a block 204, performing a configured grant (CG) transmission using a first parameter from the IE, wherein the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH. This can solve issues in the prior art, support HARQ-ACK codebooks in CG, support a PUSCH transmission scheme switching, support power control for CG, provide a good communication performance, and/or provide high reliability.

Figure 4:
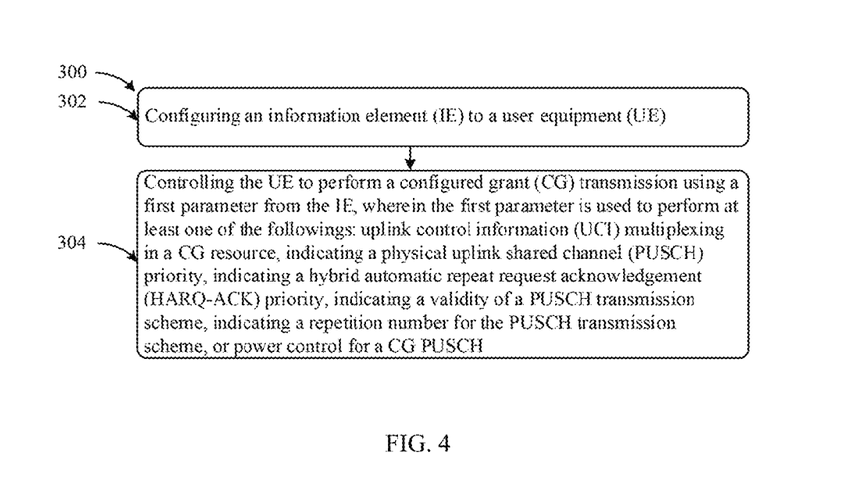
FIG. 4 is a flowchart illustrating a method of wireless communication performed by a base station according to an embodiment of the present disclosure.

FIG. 4 illustrates a method 300 of wireless communication by a base station according to an embodiment of the present disclosure. In some embodiments, the method 300 includes: a block 302, configuring an information element (IE) to a user equipment (UE), and a block 304, controlling the UE to perform a configured grant (CG) transmission using a first parameter from the IE, wherein the first parameter is used to perform at least one of the followings: uplink control information (UCI) multiplexing in a CG resource, indicating a physical uplink shared channel (PUSCH) priority, indicating a hybrid automatic repeat request acknowledgement (HARQ-ACK) priority, indicating a validity of a PUSCH transmission scheme, indicating a repetition number for the PUSCH transmission scheme, or power control for a CG PUSCH. This can solve issues in the prior art, support HARQ-ACK codebooks in CG, support a PUSCH transmission scheme switching, support power control for CG, provide a good communication performance, and/or provide high reliability.

In some embodiments, the IE comprises a ConfiguredGrantConfig IE. In some embodiments, the PUSCH transmission scheme comprises a release 15 PUSCH transmission scheme and/or a release 16 PUSCH transmission scheme. In some embodiments, the first parameter comprises a UCI-OnPUSCH parameter configured in the IE, and the UCI-OnPUSCH parameter is used for UCI multiplexing in the CG resource.

In some embodiments, if a 2-level physical priority of the CG PUSCH is determined by an indication in each CG configuration from the base station, the UCI-OnPUSCH parameter is configured to match a CG priority. In some embodiments, the indication in each CG configuration comprises a radio resource control (RRC) parameter.

In some embodiments, the first parameter comprises one of two UCI-OnPUSCH or BetaOffsets parameters, and the two UCI-OnPUSCH or BetaOffsets parameters are configured in the IE. In some embodiments, performing the CG transmission using the first parameter from the IE further comprises: receiving an indication in a type 2 CG PUSCH activation from the base station; and selecting one of two UCI-OnPUSCH or BetaOffsets parameters based on the indication in the type 2 CG PUSCH activation. In some embodiments, the indication in the type 2 CG PUSCH activation is used to indicate the PUSCH priority and/or apply a radio network temporary identifier (RNTI), a control resource set (CORESET), search space, a downlink control information (DCI) format, a field in a DCI of the DCI for the type 2 CG PUSCH activation. In some embodiments, if a 2-level physical priority of the CG PUSCH is overridden by the type2 CG PUSCH activation, the first parameter is configured to match a CG priority.

In some embodiments, performing the CG transmission using the first parameter from the IE further comprises: receiving an indication in a DCI for physical downlink shared channel (PDSCH) from the base station, wherein a HARQ-CK for PDSCH is multiplexed in a type 2 CG PUSCH; and selecting one of two UCI-OnPUSCH or BetaOffsets parameters based on the indication in the DCI for PDSCH. In some embodiments, the indication in the DCI for PDSCH is used to indicate the HARQ-ACK priority and/or apply a RNTI, a CORESET, search space, a DCI format, a field in a DCI of the DCI for a type 2 CG PUSCH activation. In some embodiments, if a 2-level physical priority of the CG PUSCH is determined by an indication in each CG configuration from the base station, the first parameter is configured to match a CG priority and the HARQ-ACK priority. In some embodiments, the indication in each CG configuration comprises an RRC parameter.

In some embodiments, performing the CG transmission using the first parameter from the IE further comprises: receiving a first indication in a type 2 CG PUSCH activation and a second indication in a DCI for PDSCHfrom the base station, wherein a HARQ-CK for PDSCH is multiplexed in a type 2 CG PUSCH; and selecting one of two UCI-OnPUSCH or BetaOffsets parameters based on the first indication in the type 2 CG PUSCH activation and the second indication in the DCI for PDSCH. In some embodiments, the first indication in the type 2 CG PUSCH activation is used to indicate the PUSCH priority and/or apply a RNTI, a CORESET, search space, a DCI format, a field in a DCI of the DCI for the type 2 CG PUSCH activation; and/or the second indication in the DCI for PDSCH is used to indicate the HARQ-ACK priority and/or apply the RNTI, the CORESET, the search space, the DCI format, the field in the DCI of the DCI for the type 2 CG PUSCH activation. In some embodiments, if a 2-level physical priority of the CG PUSCH is overridden by the type2 CG PUSCH activation, the first parameter is configured to match a CG priority and the HARQ-ACK priority.

In some embodiments, the first parameter is used to indicate whether the release 15 PUSCH transmission scheme or the release 16 PUSCH transmission scheme is valid. In some embodiments, a time domain resource allocation is determined by a type 2 CG activation and/or the first parameter.

In some embodiments, the first parameter comprises a repK parameter configured in the IE, and the repK parameter is used to indicate a repetition number for the PUSCH transmission scheme. In some embodiments, if the repK parameter is larger than 1, the release 15 PUSCH transmission scheme is applied; or otherwise if the repK parameter is not larger than 1, the PUSCH transmission scheme depends on a DCI format. In some embodiments, if the repK parameter is equal to 1, the PUSCH transmission scheme depends on the DCI format. In some embodiments, the PUSCH transmission scheme is associated with the DCI format. In some embodiments, association between the PUSCH transmission scheme and the DCI format is configured by a high layer parameter. In some embodiments, a PUSCH transmission scheme configuration is semi-static for configured grant.

In some embodiments, the first parameter comprises a power control parameter configured in the IE, the power control parameter is used for the power control for the CG PUSCH except a first CG PUSCH, and an open-loop parameter in a DCI for a type 2 configured grant activation is used for power control for the first CG PUSCH.

Some embodiments of the present disclosure provide solutions to support two HARQ-ACK codebooks in configured grant, PUSCH transmission scheme switching between Rel-15 and Rel-16, and/or power control for configured grant. Some embodiments of the present disclosure provide methods to enable a UE to determine whether remaining minimum system information (RMSI) control resource set (CORESET configuration tables are based on the ones for 5 MHz minimum channel bandwidth or the ones for 10 MHz minimum channel bandwidth to solve issues in the prior art, i.e. How to use HARQ-ACK codebooks, power control for inter-UE multiplexing, and/or PUSCH repetition enhancement in configured grant transmission is still an open issue.

Example

One UCI-OnPUSCH parameter is configured directly in ConfiguredGrantConfig information element (IE). The UCI-OnPUSCH parameter is used for UCI multiplexing in a configured grant resource. Benefit effect of the example includes that if a 2-level physical (PHY) priority of CG PUSCH is determined by an explicit indication (as a new RRC parameter) in each CG configuration, the UCI-OnPUSCH parameter can be configured to match a configured grant priority.

Example

At least two UCI-OnPUSCH or BetaOffsets parameters are configured in ConfiguredGrantConfig IE. One of the two UCI-OnPUSCH or BetaOffsets parameters is selected based on an indication in a type 2 CG PUSCH activation. The indication in the type 2 CG PUSCH activation is used to indicate a PUSCH priority. Optionally, the indication in the type 2 CG PUSCH activation could apply a RNTI, a CORESET, search space, a DCI format, or a field in DCI of DCI for type 2 CG PUSCH activation. Benefit effect of this example includes that if a 2-level PHY priority of a CG PUSCH can be overridden by the type2 CG PUSCH activation, due to the PUSCH priority is undefined before the type2 CG PUSCH activation, the UCI-OnPUSCH parameter matching the PUSCH priority also cannot be defined. This example makes UCI-OnPUSCH parameter for configured grant match the configured grant priority.

Example

At least two UCI-OnPUSCH or BetaOffsets parameters are configured in ConfiguredGrantConfig IE for type 2 CG. One of the two UCI-OnPUSCH or BetaOffsets parameters is selected based on an indication in a DCI for PDSCH. HARQ-CK for the PDSCH is multiplexed in the type 2 CG PUSCH. The indication in the DCI for PDSCH is used to indicate a HARQ-ACK priority. Optionally, the indication could apply a RNTI, a CORESET, search space, a DCI format, or a field in DCI of DCI for type 2 CG PUSCH activation. Benefit effect of this example includes that if a 2-level PHY priority of a CG PUSCH is determined by an explicit indication (as a new RRC parameter) in each CG configuration, however, UCI multiplexed in the type 2 CG PUSCH is undefined before a HARQ-ACK transmission occurs. This example makes UCI-OnPUSCH parameter for configured grant match the configured grant priority and the HARQ-ACK priority.

Example

At least two UCI-OnPUSCH or BetaOffsets parameters are configured in ConfiguredGrantConfig IE. One of the two UCI-OnPUSCH or BetaOffsets parameters is selected based on a first indication in a type 2 CG PUSCH activation and a second indication in a DCI for PDSCH. HARQ-CK for the PDSCH is multiplexed in the type 2 CG PUSCH. The first indication in the type 2 CG PUSCH activation is used to indicate a PUSCH priority. The second indication in the DCI for PDSCH is used to indicate a HARQ-ACK priority. Optionally, the first indication and/or the second indication could apply a RNTI, a CORESET, search space, a DCI format, or a field in DCI of DCI for type 2 CG PUSCH activation. Benefit effect of this example includes that if a 2-level PHY priority of a CG PUSCH can be overridden by the type2 CG PUSCH activation, due to the PUSCH priority is undefined before the type2 CG PUSCH activation, the UCI-OnPUSCH parameter matching the PUSCH priority also cannot be defined, UCI multiplexed in the type 2 CG PUSCH is also undefined before a HARQ-ACK transmission occurs. This example makes UCI-OnPUSCH parameter for configured grant match the configured grant priority and the HARQ-ACK priority.

Example

A parameter in ConfiguredGrantConfig IE to indicate which PUSCH transmission scheme (Rel-15 or Rel-16) is valid. Time domain resource allocation is determined by a type 2 CG activation and the parameter.

Example repK in ConfiguredGrantConfig IE is to indicate a repetition number for a Rel-15 PUSCH transmission scheme and/or a PUSCH transmission scheme such as a Rel-16 PUSCH transmission scheme. If repK is larger than 1, the Rel-15 PUSCH transmission scheme is applied, otherwise (for example, RepK in ConfiguredGrantConfig=1), the PUSCH transmission scheme such as the Rel-16 PUSCH transmission scheme depends on a DCI format. Optionally, the PUSCH transmission scheme such as the Rel-16 PUSCH transmission scheme is associated with the DCI format. Association between the PUSCH transmission scheme such as the Rel-16 PUSCH transmission scheme and the DCI format is configured by a high layer parameter. Optionally, the repetition scheme includes Rel-15 PUSCH transmission scheme and Rel-16 PUSCH transmission scheme. Benefit effect of this example includes that a PUSCH transmission scheme configuration is semi-static for configured grant, and/or reusing rep-K does not impact flexibility and reduce overhead.

Example

An open-loop parameter in a DCI for type 2 configured grant activation is used for power control for a first CG PUSCH. Power control for a CG PUSCH except the first CG PUSCH is based on a power control parameter in ConfiguredGrantConfig IE.

In summary, the methods disclosed in some embodiments of the present application can be used to achieve at least the followings: Two HARQ-ACK codebooks in a configured grant are provided to make UCI multiplexing more efficient due to it matches a PUSCH priority and a HARQ-ACK priority. PUSCH transmission scheme switching is between Rel-15 and Rel-16, in which reusing repK does not impact transmission efficiency and reduce signaling overhead. Power control for configured grant makes a first CG PUSCH power control efficient, which can match system scheduling condition in time.

Commercial interests for some embodiments are as follows. 1. Solving issues in the prior art. 2. Supporting HARQ-ACK codebooks in CG. 3. Supporting a PUSCH transmission scheme switching. 4. Support power control for CG. 5. Providing a good communication performance. 6. Providing a high reliability. 7. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure propose technical mechanisms.

Figure 5:
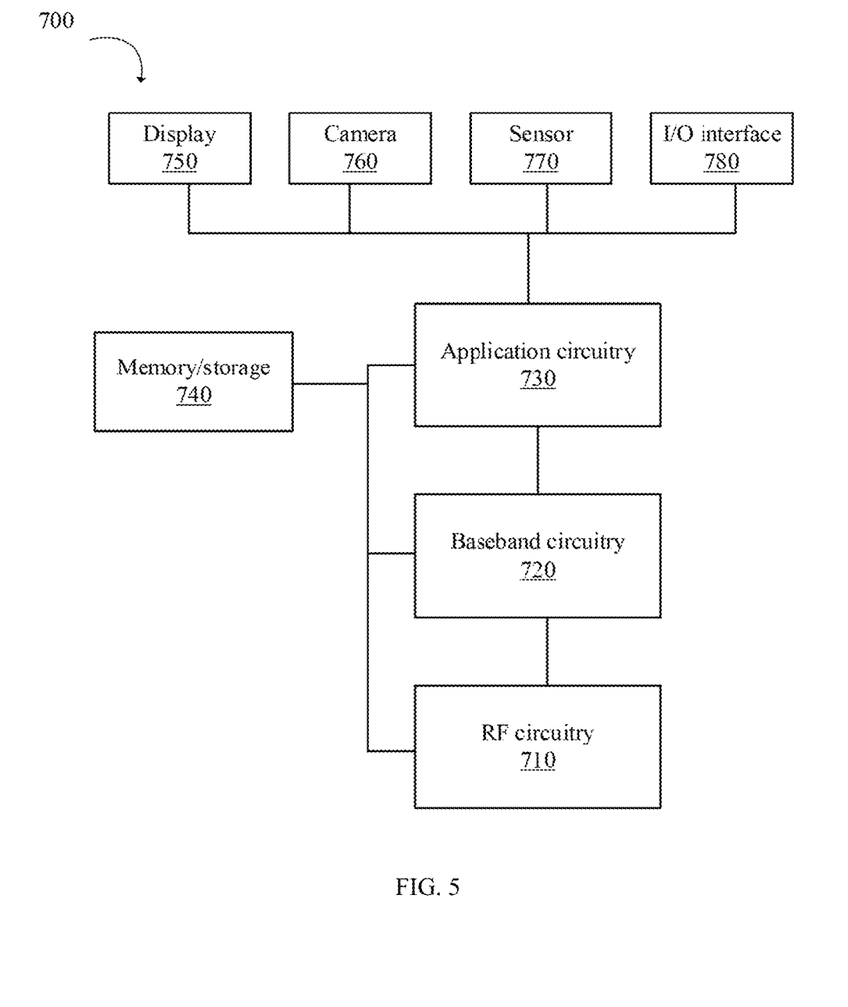
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
   receiving an information element (IE) from a base station;
   configuring the UE with the IE; and
   performing a configured grant (CG) transmission using parameters configured by the IE, wherein the parameters are used to perform at least the followings:
   indicating a release 15 PUSCH transmission scheme or a release 16 PUSCH transmission scheme; and
   indicating a repetition number for the release 15 PUSCH transmission scheme or the release 16 PUSCH transmission scheme.

2. The method of claim 1, wherein the parameters configured by the IE are further used to perform the following:
   indicating a physical uplink shared channel (PUSCH) priority.

3. The method of claim 1, wherein the IE comprises a ConfiguredGrantConfig IE.

4. The method of claim 1, wherein the CG transmission includes a type 1 CG transmission.

5. The method of claim 1, wherein performing the CG transmission using a first parameter from the IE further comprises:
   receiving an indication in a DCI for physical downlink shared channel (PDSCH) from the base station, wherein a HARQ-ACK for PDSCH is multiplexed in a type 2 CG PUSCH; and selecting one of two UCI-OnPUSCH or BetaOffsets parameters based on the indication in the DCI for PDSCH.

6. The method of claim 5, wherein the indication in the DCI for PDSCH is used to indicate the HARQ-ACK priority and/or apply a RNTI, a CORESET, search space, a DCI format, a field in a DCI of the DCI for a type 2 CG PUSCH activation.

7. The method of claim 5, wherein responsive to determining that a 2-level physical priority of the CG PUSCH is determined by an indication in each CG configuration from the base station, the first parameter is configured to match a CG priority and the HARQ-ACK priority.

8. The method of claim 7, wherein the indication in each CG configuration comprises an RRC parameter.

9. The method of claim 1, wherein a first parameter comprises a repK parameter configured in the IE, and the repK parameter is used to indicate a repetition number for the PUSCH transmission scheme.

10. The method of claim 9, wherein the PUSCH transmission scheme is associated with a DCI format.

11. A wireless communication method by a base station, comprising:
   configuring an information element (IE);
   transmitting the IE to a user equipment (UE); and
   controlling the UE to perform a configured grant (CG) transmission using parameters from the IE, wherein the parameters are used to perform at least the followings:
   indicating a release 15 PUSCH transmission scheme or a release 16 PUSCH transmission scheme; and
   indicating a repetition number for the release 15 PUSCH transmission scheme or the release 16 PUSCH transmission scheme.

12. The method of claim 11, wherein the parameters configured by the IE are further used to perform the following:
   indicating a physical uplink shared channel (PUSCH) priority.

13. The method of claim 11, wherein the IE comprises a ConfiguredGrantConfig IE.

14. The method of claim 11, wherein the CG transmission includes a type 1 CG transmission.

15. The method of claim 11, wherein a first parameter comprises a repK parameter configured in the IE, and the repK parameter is used to indicate a repetition number for the PUSCH transmission scheme.

16. A user equipment (UE), comprising:
   a memory;
   a transceiver; and
   a processor coupled to the memory and the transceiver;
   wherein the processor is configured to receive an information element (IE) from a base station;
   wherein the processor is configured with the IE; and
   wherein the processor is configured to perform a configured grant (CG) transmission using parameters from the IE, and the parameters are used to perform at least the followings:
   indicating a release 15 PUSCH transmission scheme or a release 16 PUSCH transmission scheme; and
   indicating a repetition number for the release 15 PUSCH transmission scheme or the release 16 PUSCH transmission scheme.

17. The UE of claim 16, wherein the parameters configured by the IE are further used to perform the following:
   indicating a physical uplink shared channel (PUSCH) priority.

18. The UE of claim 16, wherein the IE comprises a ConfiguredGrantConfig IE.

19. The UE of claim 16, wherein the CG transmission includes a type 1 CG transmission.

20. The UE of claim 16, wherein a first parameter comprises a repK parameter configured in the IE, and the repK parameter is used to indicate a repetition number for the PUSCH transmission scheme.

21. A base station, comprising:
   a memory;
   a transceiver; and
   a processor coupled to the memory and the transceiver;
   wherein the processor is configured to;
   configure an information element (IE);
   transmit the IE to a user equipment (UE); and
   control the UE to perform a configured grant (CG) transmission using parameters from the IE;
   wherein the parameters are used to perform at least the followings:
   indicating a release 15 PUSCH transmission scheme or a release 16 PUSCH transmission scheme; and
   indicating a repetition number for the release 15 PUSCH transmission scheme or the release 16 PUSCH transmission scheme.

22. The base station of claim 21, wherein the parameters configured by the IE are further used to perform the following:
   indicating a physical uplink shared channel (PUSCH) priority.

23. The base station of claim 21, wherein the IE comprises a ConfiguredGrantConfig IE.

24. The base station of claim 21, wherein the CG transmission includes a type 1 CG transmission.

25. The base station of claim 21, wherein a first parameter comprises a repK parameter configured in the IE, and the repK parameter is used to indicate a repetition number for the PUSCH transmission scheme.

* * * * *